United States Patent [19]
Welch et al.

[11] Patent Number: 6,060,001
[45] Date of Patent: May 9, 2000

[54] ALKOXYACRYLAMIDE PHOTOCHROMIC COATINGS COMPOSITIONS AND PHOTOCHROMIC ARTICLES

[75] Inventors: Cletus N. Welch, Murrysville; Shanti Swarup, Allison Park, both of Pa.

[73] Assignee: PPG Industries Ohio, Inc., Cleveland, Ohio

[21] Appl. No.: 09/211,249

[22] Filed: Dec. 14, 1998

[51] Int. Cl.⁷ .............................. G02B 5/23; G02C 7/10; B32B 27/00
[52] U.S. Cl. ........................ 252/586; 351/163; 428/500; 428/501; 428/511; 428/412; 428/424.2; 428/441; 428/461
[58] Field of Search ............................ 252/586; 428/500, 428/501, 412, 424.2, 441, 461, 511; 351/163

[56] References Cited

U.S. PATENT DOCUMENTS

| | | | |
|---|---|---|---|
| 3,361,706 | 1/1968 | Smith et al. ............................. | 260/39 |
| 4,720,356 | 1/1988 | Chu .......................................... | 252/586 |
| 4,873,029 | 10/1989 | Blum ........................................ | 264/1.3 |
| 4,931,220 | 6/1990 | Haynes et al. .......................... | 252/586 |
| 5,391,327 | 2/1995 | Ligas et al. ............................. | 252/586 |
| 5,618,586 | 4/1997 | Swarup et al. ........................ | 427/407.1 |
| 5,645,767 | 7/1997 | Van Gemert ............................ | 252/586 |
| 5,658,501 | 8/1997 | Kumar et al. ........................... | 252/586 |
| 5,770,115 | 6/1998 | Misura .................................... | 252/586 |

FOREIGN PATENT DOCUMENTS 7-258585  10/1995  Japan.

*Primary Examiner*—Philip Tucker
*Attorney, Agent, or Firm*—Frank P. Mallak; Irwin M. Stein

[57] ABSTRACT

Described are articles having an alkoxyacrylamide photochromic coating. The coatings exhibit a Fischer microhardness of from 50 to 130 Newtons per $mm^2$ and desirable photochromic properties, i.e., the formation of darker activated colors and faster rates of photochromic activation and fade when irradiated with ultraviolet light. Also described are alkoxyacrylamide photochromic articles.

22 Claims, No Drawings

6,060,001

ALKOXYACRYLAMIDE PHOTOCHROMIC COATINGS COMPOSITIONS AND PHOTOCHROMIC ARTICLES

DESCRIPTION OF THE INVENTION

The present invention relates to coatings comprising N-alkoxymethyl(meth)acrylamide functional polymer(s) and photochromic substance(s), hereinafter referred to as photochromic alkoxyacrylamide coatings; articles coated with such coatings; and photochromic articles, i.e., polymerizates, made from such polymerizable compositions. More particularly, this invention relates to certain photochromic alkoxyacrylamide coatings which when present on a substrate and exposed to activating light radiation exhibit improved photochromic performance properties. Further, this invention relates to photochromic alkoxyacrylamide coatings that meet commercially acceptable "cosmetic" standards for optical coatings applied to optical elements, e.g., lenses.

Photochromic compounds exhibit a reversible change in color when exposed to light radiation involving ultraviolet rays, such as the ultraviolet radiation in sunlight or the light of a mercury lamp. Various classes of photochromic compounds have been synthesized and suggested for use in applications in which a sunlight-induced reversible color change or darkening is desired. The most widely described classes of photochromic compounds are oxazines, pyrans and fulgides.

The herein described photochromic alkoxyacrylamide coatings demonstrate good photochromic properties, i.e., color and fade at acceptable rates and achieve a dark enough colored state, and meet optical coating "cosmetic" standards. The novel coatings described herein also exhibit a Fischer microhardness of from at least 50 to not more than 130 Newtons per $mm^2$. Further, the composition used to form the photochromic coating may be used to form a photochromic alkoxyacrylamide polymerizate.

DETAILED DESCRIPTION OF THE INVENTION

In recent years, photochromic articles, particularly photochromic plastic materials for optical applications, have been the subject of considerable attention. In particular, photochromic ophthalmic plastic lenses have been investigated because of the weight advantage they offer, vis-à-vis, glass lenses. Moreover, photochromic transparencies for vehicles, such as cars and airplanes, have been of interest because of the potential safety features that such transparencies offer. Photochromic articles that are most useful are those in which the photochromic compounds associated with the article exhibit a high activated intensity, a high coloration rate and an acceptable fade rate.

The use of photochromic coatings enables the preparation of photochromic plastic articles without the need to incorporate the photochromic compound(s) into the plastic substrate, which avoids the need to develop special optical resin materials for use with photochromic compounds. This is advantageous when the plastic, e.g., thermoplastic polycarbonate, does not have enough internal free volume for a photochromic compound incorporated into the plastic to function properly. The coating composition of the present invention enables preparation of photochromic articles using such plastics. Further, use of photochromic coatings results in more efficient utilization of photochromic compounds by avoiding the losses associated with more conventional transfer methods, e.g., imbibition or permeation, to produce photochromic articles.

Other than in the operating examples, or where otherwise indicated, all values, such as those expressing wavelengths, quantities of ingredients, ranges or reaction conditions, used in this description and the accompanying claims are to be understood as modified in all instances by the term "about".

The photochromic coating composition of the present invention may be prepared by combining a photochromic component with the free radical initiated reaction product of a polymerizable ethylenically unsaturated composition comprising: a) from 25 to 80% by weight of an N-alkoxymethyl (meth)acrylamide; and b) from 20 to 75% by weight of at least one other copolymerizable ethylenically unsaturated monomer, said weight percentages being based on the total weight of the polymerizable ethylenically unsaturated monomers.

Optional ingredients that may be included in the composition are crosslinking agents, e.g., melamine resins, and plasticizers which may be included in amounts necessary to adjust the Fischer microhardness levels as well as the photochromic performance properties to within desired ranges. Solvents may also be present in the coating composition to dissolve certain materials, act as carriers and/or adjust the viscosity of the coating composition for different application methods. However, as described herein, solvents are not factored into the weight ratios and weight percentages stated herein. All weight ratios and weight percentages used herein are based on the total solids in the coating composition, unless stated otherwise.

When the coating compositions of the present invention are applied as a coating and cured, the coating exhibits a Fischer microhardness of at least 50 Newtons per $mm^2$, preferably at least 60, more preferably, at least 70 Newtons per $mm^2$ and not more than 130 Newtons per $mm^2$, preferably, not more than 125 and more preferably not more than 120 Newtons per $mm^2$. The Fischer microhardness of the coating may range between any combination of these values, inclusive of the recited values. The photochromic properties of the cured coatings of the present invention are characterized by a $\Delta OD$ after 30 seconds of at least 0.12, preferably, at least 0.13 and most preferably, at least 0.15; and a $\Delta OD$ after 15 minutes of at least 0.50, preferably, at least 0.55, and most preferably, at least 0.60; and a bleach rate of not more than 200 seconds, preferably, not more than 190, and most preferably, not more than 180 seconds—all as measured at 72° F. (22° C.), and as described in Part C of Example 12 herein.

Alkoxyacrylamide coatings having microhardness and photochromic performance properties within the aforestated ranges can be produced by balancing the amounts of the components of the polymerizable composition used to prepare the coating matrix. For example, the specific properties of the components comprising the coating matrix or polymerizate that will effect the microhardness and photochromic performance properties of the acrylamide matrix are the glass transition temperature and molecular weight of the components and the crosslink density of the resultant matrix. Generally, using components having higher glass transition temperatures and molecular weights results in coatings and polymerizates having an increased microhardness and vice versa. An increase in the number of reactive groups of a component will also cause an increase in the microhardness, provided that all of the groups are reacted. In this latter case, an increase in the number of reactive groups, i.e., crosslinking sites, increases the crosslinked density of the cured coating. It is believed however that the harder the coating or polymerizate the slower the performance of the photochromic compound contained therein.

The contribution of a particular component, e.g., monomer, to either the hardness or softness of the alkoxyacrylamide coating can be readily determined by measuring the Fischer microhardness of the resulting alkoxyacrylamide coating. The hardness-producing component, as defined herein, is a component that increases the microhardness of the alkoxyacrylamide coating as its concentration increases. Similarly, the softness-producing component, as defined herein, is a component that decreases the microhardness of the alkoxyacrylamide coating as its concentration increases. Examples of hardness-producing monomers include, but are not limited to, styrene, methyl styrene dimer, methyl methacrylate, isobornyl methacrylate, and cyclohexyl methacrylate. The softness-producing monomers include, but are not limited to, butyl acrylate, isodecyl acrylate, 2-ethylhexyl acrylate, stearyl acrylate, lauryl acrylate, and alkoxy poly(alkyleneglycol)(meth)acrylate, e.g., methoxy polyethylene glycol monomethacrylate.

The N-alkoxymethyl(meth)acrylamide functional polymer in the coating composition of the present invention may be prepared by reacting an N-alkoxymethyl(meth)acrylamide with at least one other ethylenically unsaturated monomer that is substantially free of alkoxyacrylamide functionality via free radical initiated addition polymerization techniques. The term N-alkoxymethyl(meth)acrylamide means either N-alkoxymethylacrylamide or N-alkoxymethylmethacrylamide.

The N-alkoxymethyl(meth)acrylamide typically has 1 to 6, preferably 1 to 4 carbon atoms in the alkoxy group. Examples include N-ethoxymethyl(meth)acrylamide and N-butoxymethyl(meth)acrylamide. N-butoxymethyl(meth)acrylamide is preferred and N-butoxymethylacrylamide is most preferred. The amount of N-alkoxymethyl(meth)acrylamide that is present in the polymerizable composition is at least 25% by weight, preferably at least 30% by weight, and most preferably at least 35% by weight. Typically, the amount of N-alkoxymethyl(meth)acrylamide is present in amounts of not more than 80% by weight, preferably, not more than 70% and most preferably not more than 55%, based on the total weight of the polymerizable ethylenically unsaturated monomers used in preparing the polymer. The amount of N-alkoxymethyl(meth)acrylamide present in the polymerizable composition may range between any combination of these values, inclusive of the recited values.

The copolymerizable ethylenically unsaturated monomers substantially free of alkoxyacrylamide functionality used in the polymerizable composition include vinyl aromatic monomers such as styrene, alpha-methyl styrene, and tertiary butyl styrene; (meth)acrylamidobutyraldehyde dialkyl acetal monomers such as acrylamidobutyraldehyde diethyl acetal (ABDA), methacrylamidobutyraldehyde diethyl acetal (MABDA), and the like; vinyl aliphatic monomers such as ethylene, propylene, and 1,3-butadiene; poly(alkyleneglycol)(meth)acrylate, e.g., methoxypolyethylene glycol monomethacrylate; epoxy-functional monomers, e.g., glycidyl (meth)acrylate, and glycidoxypropyl (meth)acrylate; and alkyl esters of acrylic and methacrylic acid having from 1 to 17 carbon atoms in the alkyl group, including methyl (meth)acrylate, ethyl (meth)acrylate, butyl (meth)acrylate, isodecyl (meth)acrylate, cyclohexyl (meth)acrylate, 2-ethylhexyl (meth)acrylate, isobornyl (meth)acrylate and lauryl (meth)acrylate. The amount of such ethylenically unsaturated monomers that may be present in the polymerizable composition is at least 20% by weight, preferably at least 30%by weight, and most preferably at least 45% by weight. Typically, the amount of such ethylenically unsaturated monomer present in the polymerizable composition is not more than 75% by weight, preferably, not more than 70% and most preferably not more than 65%, based on the total weight of the polymerizable ethylenically unsaturated monomers used in preparing the polymer. The amount of such ethylenically unsaturated monomers that may be present in the polymerizable composition may range between any combination of these values, inclusive of the recited values.

Preferably, the ethylenically unsaturated monomer used is selected from the group consisting of styrene, methyl (meth)acrylate, butyl (meth)acrylate, cyclohexyl (meth)acrylate, isodecyl (meth)acrylate and mixtures thereof.

The N-alkoxymethyl(meth)acrylamide functional polymers described herein can be prepared by free radical initiated addition polymerization of a mixture of the monomers by organic solution polymerization techniques, as described in U.S. Pat. No. 5,618,586, which is incorporated herein by reference. Typically, the monomers are dissolved in an organic solvent or mixture of solvents such as Aromatic 100, a mixture of high boiling hydrocarbon solvents available from Union Carbide. The solvent is first heated to reflux, usually 110° to 160° C., and a mixture of monomers and free radical initiator is slowly added to the refluxing solvent over a period of about 1 to 5, preferably 1 to 3, hours. Adding the monomers too quickly may cause poor conversion or a high and rapid exotherm, which is a safety hazard. Adding the monomers over a period greater than 5 hours yields a polymer with an undesirably high molecular weight. Suitable free radical initiators include t-amyl peroxyacetate, di-t-amyl peroxyacetate, and 2,2'-azobis(2-methylbutanenitrile). The free radical initiator is typically present in the reaction mixture at about 2 to 10%, based on the total weight of the monomers.

The polymer prepared by the aforedescribed technique is non-gelled or ungelled and preferably has a weight average molecular weight of about 2000 to 8500, more preferably 2000 to 6000. By "non-gelled" or ungelled is meant that the resin is substantially free of crosslinking, and the resin has a measurable intrinsic viscosity when dissolved in a suitable solvent. In contrast, a gelled resin, having an essentially infinite molecular weight, has an intrinsic viscosity too high to measure by gel permeation chromatography. Lower molecular weight polymers (less than about 3000 weight average molecular weight) may be prepared by synthesizing the polymer in high boiling solvents at a relatively low solids content (about 30–40 percent by weight, based on total weight of the reaction mixture). After the reaction, the excess solvents may be removed from the reaction mixture under reduced pressure to yield a product with a relatively high solids content (from 50 to 60 weight percent solids).

The coating composition of the present invention may include a catalyst to accelerate cure. Examples of suitable catalysts are acidic materials and include phenyl acid phosphate, sulfonic acid, or a substituted sulfonic acid such as paratoluene sulfonic acid and dodecyl benzene sulfonic acid. The amount of optional catalyst used is a catalytic amount, i.e., an amount necessary to catalyze the polymerization of monomers. The catalyst may be present in an amount of from 0.2 to 2.0 percent by weight, preferably from 0.5 to 1.0 percent by weight, based on the total weight of resin solids.

Solvents that may be present in the coating composition are those that are necessary to dissolve the solid components. The minimum amount of solvent present in the coating composition is a solvating amount, i.e., an amount which is sufficient to solubilize the solid components in the coating composition. For example, the amount of solvent present may range from 10 to 80 weight percent based on the total weight of the coating composition.

Suitable solvents include, but are not limited to, the following: benzene, toluene, methyl ethyl ketone, methyl isobutyl ketone, acetone, ethanol, tetrahydrofurfuryl alcohol, propyl alcohol, propylene carbonate, N-methyl pyrrolidinone, N-vinyl pyrrolidinone, N-acetyl pyrrolidinone, N-hydroxymethyl pyrrolidinone, N-butyl pyrrolidinone, N-ethyl pyrrolidinone, N-(N-octyl) pyrrolidinone, N-(N-dodecyl)pyrrolidinone, 2-methoxyethyl ether, xylene, cyclohexane, 3-methyl cyclohexanone, ethyl acetate, butyl acetate, tetrahydrofuran, methanol, amyl propionate, methyl propionate, propylene glycol methyl ether, diethylene glycol monobutyl ether, dimethyl sulfoxide, dimethyl foramide, ethylene glycol, mono- and dialkyl ethers of ethylene glycol and their derivatives, which are sold as CELLOSOLVE industrial solvents by Union Carbide, and mixtures of such solvents.

Crosslinking agents that may be used include the melamine formaldehyde resins such as the CYMEL® series of resins available from Cytec Industries, Inc. Other optional ingredients which may be used are plasticizers such as benzoate esters, e.g., BENZOFLEX® P-200 plasticizer.

The photochromic alkoxyacrylamide coating composition of the present invention may further comprise additional conventional ingredients which impart desired characteristics to the composition, or which are required for the process used to apply and cure the composition to the substrate or which enhance the cured coating made therefrom. Such additional ingredients comprise rheology control agents, leveling agents, e.g., surfactants, initiators, cure-inhibiting agents, free radical scavengers and adhesion promoting agents, such as trialkoxysilanes preferably having an alkoxy radical of 1 to 4 carbon atoms, including γ-glycidoxypropyltrimethoxysilane, γ-aminopropyltrimethoxysilane, 3,4-epoxycyclohexylethyltrimethoxysilane and aminoethyltrimethoxysilane.

Photochromic components that may be utilized in the alkoxyacrylamide coating composition(s) of the present invention are organic photochromic compounds. Such compounds may be used individually or in combination with other complementary photochromic compounds. Organic photochromic compounds or substances containing same used in the coating compositions described herein have at least one activated absorption maxima within the range of between 400 and 700 nanometers; may be incorporated, e.g., dissolved or dispersed, in the acrylamide composition used to prepare the alkoxyacrylamide photochromic coating, and color when activated to an appropriate hue.

More particularly, in one embodiment the organic photochromic component comprises:

(a) at least one photochromic organic compound having a visible lambda max of from 400 nanometers to 525 nanometers; and (b) at least one photochromic organic compound having a visible lambda max of from greater than 525 nanometers to 700 nanometers.

Examples of suitable photochromic compounds for use in the alkoxyacrylamide coating composition of the present invention include benzopyrans, naphthopyrans, e.g., naphtho[1,2-b]pyrans and naphtho[2,1-b]pyrans, phenanthropyrans, quinopyrans, benzoxazines, naphthoxazines, spiro(indoline)pyridobenzoxazines and indeno-fused naphthopyrans such as those disclosed in U.S. Pat. No. 5,645,767. Specific examples include the novel naphthopyrans of U.S. Pat. No. 5,658,501 and the complementary organic photochromic substances disclosed in this patent from column 11, line 57 through column 13, line 36. Other photochromic substances contemplated for use herein are photochromic metal-dithizonates, e.g., mercury dithizonates, which are described in, for example, U.S. Pat. No. 3,361,706; fulgides and fulgimides, e.g. the 3-furyl and 3-thienyl fulgides and fulgimides, which are described in U.S. Pat. No. 4,931,220 at column 20, line 5 through column 21, line 38, and mixtures of the aforementioned suitable photochromic substances.

The disclosures relating to such photochromic compounds in the aforedescribed patents are incorporated herein, in toto, by reference. The photochromic coatings of the present invention may contain one photochromic compound or a mixture of photochromic compounds, as desired. Mixtures of photochromic compounds may be used to attain certain activated colors such as a near neutral gray or brown. Further discussion of neutral colors and ways to describe such colors is found in U.S. Pat. No. 5,645,767, column 12, line 66 to column 13, line 19.

The amount of the photochromic substances described herein to be used in the coating or polymerizate of the present invention is an amount sufficient to produce a photochromic effect discernible to the naked eye upon activation. Generally such amount can be described as a photochromic amount.

The relative amounts of the aforesaid photochromic compounds used will vary and depend in part upon the relative intensities of the color of the activated species of such compounds, and the ultimate color desired. Generally, the amount of photochromic substance incorporated into the coating composition may range from 0.1 to 40 weight percent based on the weight of the solids in the coating composition. Preferably, the concentration of photochromic substances ranges from 1.0 to 30 weight percent, more preferably, from 3 to 20 weight percent, and most preferably, from 5 to 15 weight percent, e.g., from 7 to 14 weight percent.

The photochromic compound(s) described herein may be incorporated into the coating composition by adding the photochromic component to the alkoxyacrylamide-forming coating composition and/or by dissolving it in solvent before adding it to the coating composition. Alternatively, the photochromic compounds may be incorporated into the cured coating or polymerizate by imbibition, permeation or other transfer methods, as is known by those skilled in the art.

Compatible (chemically and color-wise) tints, i.e., dyes, may be added to the coating composition, applied to the coated article or applied to the substrate prior to coating to achieve a more aesthetic result, for medical reasons, or for reasons of fashion. The particular dye selected will vary and depend on the aforesaid need and result to be achieved. In one embodiment, the dye may be selected to complement the color resulting from the activated photochromic substances, e.g., to achieve a more neutral color or absorb a particular wavelength of incident light. In another embodiment, the dye may be selected to provide a desired hue to the substrate and/or coated article when the photochromic substance is in an unactivated state.

Adjuvant materials may also be incorporated into the coating composition with the photochromic substances, prior to, simultaneously with or subsequent to application or incorporation of the photochromic substances in the coating composition or cured coating. For example, ultraviolet light absorbers may be admixed with photochromic substances before their addition to the coating composition or such absorbers may be superposed, e.g., superimposed, as a layer between the photochromic coating and the incident light. Further, stabilizers may be admixed with the photochromic substances prior to their addition to the coating composition to improve the light fatigue resistance of the photochromic substances. Stabilizers, such as hindered amine light stabilizers (HALS), antioxidants, e.g., polyphenolic antioxidants, asymmetric diaryloxalamide (oxanilide) compounds and singlet oxygen quenchers, e. g., a nickel ion complex with an organic ligand, or mixtures of stabilizers are contemplated. They may be used alone or in combination. Such stabilizers are described in U.S. Pat. Nos. 4,720,356, 5,391,327 and 5,770,115 which patents are incorporated herein by reference.

The coating compositions of the present invention may be applied to substrates, of any type such as, for example paper, glass, ceramics, wood, masonry, textiles, metals and polymeric organic materials. Preferably, the substrate is an polymeric organic material, particularly, thermoset and thermoplastic polymeric organic materials, e.g., thermoplastic polycarbonate type polymers and copolymers and homopolymers or copolymers of a polyol(allyl carbonate) used as organic optical materials.

The amount of the coating composition applied to at least one surface of the substrate is an amount necessary to incorporate a sufficient quantity of the organic photochromic substance(s) to produce a coating that exhibits the required change in optical density ($\Delta OD$) when the cured coating is exposed to UV radiation. The required change in optical density is that which, when tested at 72° F. (22° C.) produces a $\Delta OD$ of at least 0.12 after 30 seconds and at least 0.50 after 15 minutes. The bleach rate of the photochromic coating (the photochromic(s) in the coating) should be 200 seconds or less using the photochromic response testing described in Part C of Example 12 herein. The applied coating may have a thickness of at least 5 microns, preferably, at least 10 microns, more preferably, at least 20 microns, e.g., 25 microns. The applied coating will also usually have a thickness of not more than 200 microns, preferably not more than 100 microns, and more preferably not more than 50 microns, e.g., 40 microns. The thickness of the coating may range between any combination of these values, inclusive of the recited values.

It is typical to treat the surface of the substrate to be coated prior to applying the coating composition of the present invention for the purposes of cleaning the surface and promoting adhesion. Effective treatment techniques for plastics, such as those prepared from CR-39® diethylene glycol bis(allyl carbonate) monomer or thermoplastic polycarbonate, e.g., a resin derived from bisphenol A and phosgene, include ultrasonic cleaning; washing with an aqueous mixture of organic solvent, e.g., a 50:50 mixture of isopropanol: water or ethanol: water; UV treatment; activated gas treatment, e.g., treatment with low temperature plasma or corona discharge, and chemical treatment such as hydroxylation, i.e., etching of the surface with an aqueous solution of alkali, e.g., sodium hydroxide or potassium hydroxide, that may also contain a fluorosurfactant. See U.S. Pat. No. 3,971,872, column 3, lines 13 to 25; U.S. Pat. No. 4,904,525, column 6, lines 10 to 48; and U.S. Pat. No. 5,104,692, column 13, lines 10 to 59, which describe surface treatments of polymeric organic materials.

The treatment used for cleaning glass surfaces will depend on the type of dirt present on the glass surface. Such treatments are known to those skilled in the art. For example, washing the glass with an aqueous solution that may contain a low foaming, easily rinsed detergent, followed by rinsing and drying with a lint-free cloth; and ultrasonic bath treatment in heated (about 50° C.) wash water, followed by rinsing and drying. Pre-cleaning with an alcohol-based cleaner or organic solvent prior to washing may be required to remove adhesives from labels or tapes.

In some cases, it may be necessary to apply a primer to the surface of the substrate before application of the coating composition of the present invention. The primer serves as a barrier coating to prevent interaction of the coating ingredients with the substrate and vice versa, and/or as an adhesive layer to adhere the coating composition to the substrate. Application of the primer may be by any of the methods used in coating technology such as, for example, spray coating, spin coating, spread coating, curtain coating, dip coating, casting or roll-coating.

The use of protective coatings, some of which may contain polymer-forming organosilanes, as primers to improve adhesion of subsequently applied coatings has been described. In particular, the use of non-tintable coatings is preferred. Examples of commercial coating products include SILVUE 124 and HI-GARD coatings, available from SDC Coatings, Inc. and PPG Industries, Inc., respectively. In addition, depending on the intended use of the coated article, it may be necessary to apply an appropriate protective coating(s), i.e., an abrasion resistant coating onto the exposed surface of the coating composition to prevent scratches from the effects of friction and abrasion. In some cases, the primer and protective coatings are interchangeable, i.e., the same coating may be used as the primer and the protective coating(s). Other coatings or surface treatments, e.g., a tintable coating, antireflective surface, etc., may also be applied to the cured coating of the present invention.

The coating composition of the present invention may be applied using the same methods described herein for applying the primer and the protective coating(s) or other methods known in the art can be used. The coating composition may be applied by spin coating, curtain coating, dip coating, spray coating or by methods used in preparing overlays. Such methods are described in U.S. Pat. No. 4,873,029, which disclosure is incorporated herein by reference.

Following application of the coating composition to the treated surface of the substrate, the coating is cured. Depending on the substrate and components selected for the coating composition of the present invention, the coating may be cured at temperatures ranging from 22° C. to 200° C. If heating is required to obtain a cured coating, temperatures of between 80° C. and a temperature above which the substrate is damaged due to heating, e.g., 80° C. to 200° C., are typically used. For example, certain organic polymeric materials may be heated up to 130° C. for a period of 1 to 16 hours in order to cure the coating without causing damage to the substrate. While a range of temperatures has been described for curing the coated substrate, it will be recognized by persons skilled in the art that temperatures other than those disclosed herein may be used. Additional methods for curing the photochromic alkoxyacrylamide coating composition include irradiating the coating with infrared, ultraviolet, visible, thermal, microwave or electron radiation so as to initiate the polymerization reaction of the polymerizable components in the coating. This may be followed by a heating step.

Preferably, the resulting cured coating meets commercially acceptable "cosmetic" standards for optical coatings. Examples of cosmetic defects of coated lens include pits, spots, inclusions, cracks and crazing of the coating. Most preferably, the coatings prepared using the photochromic coating composition of the present invention are substantially free of cosmetic defects.

Examples of polymeric organic materials that may be substrates for the coating composition of the present invention are polymers, i.e., homopolymers and copolymers, of the monomers and mixtures of monomers disclosed in U.S. Pat. No. 5,658,501 from column 15, line 28 to column 16, line 17, which is incorporated herein by reference.

Examples of such monomers and polymers include: polyol(allyl carbonate)monomers, e.g., diethylene glycol bis(allyl carbonate), which monomer is sold under the trademark CR-39; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol)bis methacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyurethanes, polythiourethanes, thermoplastic polycarbonates, such as the carbonate-linked resin derived from bisphenol A and phosgene, which is sold under the trademark LEXAN; polyesters, such as the material sold under the trademark MYLAR; poly(ethylene terephthalate); polyvinyl butyral; and poly(methyl methacrylate), such as the material sold under the trademark PLEXIGLAS and mixtures thereof.

More particularly contemplated, is the use of the combination of the photochromic alkoxyacrylamide coating composition of the present invention with polymeric organic materials such as optically clear polymerizates, i.e., materials suitable for optical applications, such as optical elements, e.g., piano and vision correcting ophthalmic lenses, windows, clear polymeric films, automotive transparencies, e.g., windshields, aircraft transparencies, plastic sheeting, etc. Such optically clear polymerizates may have a refractive index that may range from about 1.48 to about 1.75, e.g., from about 1.495 to about 1.66. Specifically contemplated are optical elements made of thermoplastic polycarbonates. Application of the photochromic acrylamide coating composition of the present invention to a polymeric film in the form of an "applique" may be accomplished using the methods describe in column 17, line 28 to column 18, line 57 of U.S. Pat. No. 5,198,267.

Most particularly contemplated, is the use of the combination of the photochromic alkoxyacrylamide coating composition of the present invention with optical elements to produce photochromic optical articles. Such articles may be prepared by sequentially applying to the optical element a primer, the photochromic acrylamide composition of the present invention and appropriate protective coating(s). The resulting cured coating preferably meets commercially acceptable "cosmetic" standards for optical coatings, and most preferably, is substantially free of cosmetic defects.

In another embodiment of the invention, the photochromic coating composition may be used to form polymerizates, e.g., shaped solid optically clear polymerizates, as defined herein with respect to polymeric organic materials. Polymerization of the coating composition may be accomplished by adding to the polymerizable composition a catalyst and curing in a manner appropriate for the specific composition and desired shape. The resulting polymerizate may have a thickness of 0.5 milliliters or more.

In one contemplated embodiment, a glass two-part lens mold is filled with desolvated photochromic coating composition, i.e., the polymerizable composition containing a minimal amount of solvent, which may additionally contain a catalytic amount of para-toluene sulfonic acid. The glass mold is sealed and placed in an oven. A thermal polymerization cycle is initiated, which may range from 10 to 20 hours duration at about 45 to 110° C. Afterwards, the mold is opened and the resulting lens, i.e., polymerizate, is removed. The polymer lens thus produced is then annealed for a period and at a temperature sufficient to eliminate residual stresses in the lens. The temperature is generally between 100 and 110° C. and annealing is carried out for 1 to 5 hours. If the photochromic material was not included in the polymerizable composition, it may be incorporated into the polymerizate by imbibition, permeation or other transfer methods known to those skilled in the art.

In a further contemplated embodiment, a semi-finished single vision (SFSV) lens having an adherent layer of the photochromic polymerizable composition of the present invention may be prepared by an overmolding process. Typically, a predetermined volume of the photochromic polymerizable composition is dispensed into a volume defined by a spherical negative glass mold, which approximately matches the front surface curve and the outer diameter of a SFSV lens. The glass mold is fitted with a circular polyvinyl chloride gasket that extends approximately 0.2 millimeters above the mold and has an inside diameter approximately 4 millimeters less than outside diameter of the glass mold. After the monomer is dispensed, the SFSV lens is carefully placed on the dispensed polymerizable composition which spreads to fill the defined volume. A circular glass plate having an outside diameter equal to or greater than that of the lens is placed onto the rear surface of the lens. A spring clamp is positioned so that one side of the clamp is on the front surface of the negative mold and other side of the clamp is on the back surface of the glass plate. The resulting assembly is sealed by taping the circumference of the plate-lens-gasket-mold using polyurethane tape. The assembly is preheated in an air oven from 30 to 95° C. for a 60 minute interval and subsequently the temperature is increased from 95 to 125° C. and decreased to 82° C. over a 3 hour interval. The assembly is separated by inserting a wedge beneath the gasket between the lens and mold. The lens now has an adherent layer of from 180 to 200 microns.

The present invention is more particularly described in the following examples, which are intended as illustrative only, since numerous modifications and variations therein will be apparent to those skilled in the art.

Composition A

An N-butoxymethylacrylamide (NBMA)-functional acrylic polymer was prepared in the following way:

| Materials | Weight (grams) |
|---|---|
| Charge 1 | |
| Aromatic 100[1] | 419. 0 |
| Charge 2 | |
| Butyl acrylate | 183.5 |
| NBMA[2] | 229.3 |
| Methyl styrene dimer | 45.9 |

| Materials | Weight (grams) |
|---|---|
| Charge 3 | |
| Aromatic 100[1] | 39.8 |
| LUPERSOL 555 (M60)[3] | 63.5 |
| Charge 4 | |
| Aromatic 100[1] | 3.3 |
| LUPERSOL 555 (M60) | 5.5 |

[1] Aromatic 100 is a mixture of high temperature boiling solvents available from Union Carbide.
[2] N-butoxymethylacrylamide is 95% active in butanol.
[3] Tertiary amyl peracetate available from E. I. Du Pont Company.

Charge 1 was added to a suitable reactor and heated to reflux. At this temperature, Charges 2 and 3 were added simultaneously over 2.0 hours. Upon completing the addition of Charges 2 and 3, Charge 4 was added over 0.25 hour. The reaction mixture was then held at reflux for 0.5 hours. The finished product had a total solids content of about 43.5% (measured after one hour at 110 C.), and a weight average molecular weight (measured by gel permeation chromatography using polystyrene as a standard) of about 2,162.

Composition B

An NBMA-functional polymer was prepared in the following way:

| Materials | Weight (grams) |
|---|---|
| Charge 1 | |
| Aromatic 100 | 419.0 |
| Charge 2 | |
| Butyl methacrylate | 114.7 |
| Butyl acrylate | 114.7 |
| NBMA | 193.2 |
| Methyl styrene dimer | 45.9 |
| Charge 3 | |
| Aromatic 100 | 39.8 |
| LUPERSOL 555 (M60) | 63.5 |
| Charge 4 | |
| Aromatic 100 | 3.3 |
| LUPERSOL 555 (M60) | 5.5 |

Charge 1 was added to a suitable reactor and heated to reflux. At this temperature, Charges 2 and 3 were added simultaneously over 2.0 hours. Upon completing the addition of Charges 2 and 3, Charge 4 was added over 0.25 hours. The reaction mixture was then held at reflux for 0.5 hours. The finished product had a total solids content of about 35.9% (measured after one hour at 110 C.), and a weight average molecular weight (measured by gel permeation chromatography using polystyrene as a standard) of about 2,493.

Composition C

An NBMA-functional polymer was prepared in the following way:

| Materials | Weight (grams) |
|---|---|
| Charge 1 | |
| Aromatic 100 | 300.6 |
| Charge 2 | |
| Butyl acrylate | 275.4 |
| NBMA | 289.8 |
| Charge 3 | |
| Aromatic 100 | 47.8 |
| LUPERSOL 555 (M60) | 76.2 |
| Charge 4 | |
| Aromatic 100 | 3.92 |
| LUPERSOL 555 (M60) | 6.42 |

Charge 1 was added to a suitable reactor and heated to reflux. At this temperature, Charges 2 and 3 were added simultaneously over 2.0 hours. Upon completing the addition of Charges 2 and 3, Charge 4 was added over 0.25 hours. The reaction mixture was then held at reflux for 0.5 hours. The finished product had a total solids content of about 44.7% (measured after one hour at 110 C.), and a weight average molecular weight (measured by gel permeation chromatography using polystyrene as a standard) of about 2,568.

Composition D

The procedure for preparing Composition B was followed except that 68.8 grams of butyl acrylate and 241.5 grams of NBMA were used. The same amounts of the other components in Composition B were used. Also, after cooling to room temperature, vacuum distillation was conducted until the percent solids was increased to 62.6%. The finished product had a weight average molecular weight (measured by gel permeation chromatography using polystyrene as a standard) of about 2,329.

Composition E

The procedure for preparing Composition C was followed except that butyl acrylate was replaced with isodecyl acrylate in Charge 2. The resulting polymer had a total solids content of about 62.1% (measured after one hour at 110 C.).

Composition F

A blend of 60 weight percent of Composition D and 40 weight percent of Composition E was prepared by adding the materials to a suitable vessel equipped with an agitator and mixing for 30 to 60 minutes.

Composition G

The procedure for preparing Composition F was followed except that the weight ratio of Composition D to Composition E was 40 to 60.

Composition H

The procedure for preparing Composition F was followed except that the weight ratio of Composition D to Composition E was 20 to 80.

Composition I

The procedure for preparing Composition F was followed except that the weight ratio of Composition D to Composition E was 80 to 20.

EXAMPLE 1

The following materials were added in the order described to a suitable vessel equipped with an agitator and heating mantle.

| Materials | Weight (grams) |
|---|---|
| Charge 1 | |
| NBMA[4] | 0.56 |
| Photochromic 1[5] | 0.28 |
| Charge 2 | |
| Composition A | 4.11 |
| Charge 3 | |
| pTSA[6] | 0.024 |

[4]N-methylpyrrolidone solvent of 99% purity.
[5]A photochromic naphtho[1,2-b]pyran that exhibits a blue color when irradiated with ultraviolet light.
[6]Para-toluene sulfonic acid.

After the materials in Charge 1 were added, the agitator was turned on and heat applied until Photochromic 1 dissolved. The resulting solution was cooled to ambient temperature. Charge 2 was added and the solution was stirred for 15 to 30 minutes. Charge 3 was added and the resulting solution was mixed again for 15 to 30 minutes.

EXAMPLE 2

The procedure for preparing Example 1 was followed except that 6.25 grams of Composition B was used in place of composition A.

EXAMPLE 3

The procedure for preparing Example 1 was followed except that 3.96 grams of Composition C was used in place of composition A and 0.026 grams of pTSA were used.

EXAMPLE 4

The procedure for preparing Example 1 was followed except that 4.00 grams of Composition F was used in place of Composition A and 0.026 grams of pTSA were used.

EXAMPLE 5

The procedure for preparing Example 1 was followed except that 4.00 grams of Composition G was used in place of Composition A and 0.026 grams of pTSA was used.

EXAMPLE 6

The procedure for preparing Example 1 was followed except that 4.00 grams of Composition H was used in place of Composition A and 0.026 grams of pTSA was used.

EXAMPLE 7

The procedure for preparing Example 1 was followed except that Composition G was used in place of Composition A and the amount of pTSA used was 1 weight percent of solids.

EXAMPLE 8

The procedure of Example 7 was followed except that the amount of pTSA used was 0.4 weight percent of solids.

EXAMPLE 9

The procedure of Example 7 was followed except that the amount of pTSA used was 0.1 weight percent of solids.

EXAMPLE 10

The procedure for preparing Example 1 was followed except that the following materials were used: 10 weight percent, based on total solids, of BENZOFLEX P-200, 5.00 grams of Composition D in place of Composition A, 0.019 grams of pTSA, 0.20 grams of NMP and 0.33 grams of Photochromic 1.

EXAMPLE 11

The procedure for preparing Example 10 was followed except that 20 weight percent, based on total solids, BENZOFLEX P-200 was added and 0.70 grams of NMP was used.

COMPARATIVE EXAMPLE 1 (CE1)

The procedure for preparing Example 1 was followed except that 4.00 grams of Composition D was used in place of Composition A.

COMPARATIVE EXAMPLE 2 (CE2)

The procedure for preparing Example 1 was followed except that 4.02 grams of Composition E was used in place of Composition A and 0.026 grams of pTSA was used.

COMPARATIVE EXAMPLE 3 (CE3)

The procedure for preparing Example 1 was followed except that 4.00 grams of Composition I was used in place of Composition A and 0.026 grams of pTSA was used.

EXAMPLE 12

Part A

The solutions prepared in Examples 1–11 and Comparative Examples 1–3 were applied via a spincoating method to lens blanks made of CR-39® monomer. Prior to application of the coating, each lens blank was washed with detergent, rinsed with water, immersed for 20 minutes in an aqueous 40 weight percent sodium hydroxide solution which was maintained at 23–25° C. and then washed with detergent and rinsed with water. The solutions were dispensed onto each lens which was spinning at 900 rpm for the time periods listed in Table 1. Due to differences in solution viscosity, the variety of times listed in Table 1 were used to obtain the proper coating thicknesses of about 20 micron and comparable UV absorbances at 390 nanometers of from about 1.8 to 2.2. The lenses coated with the solutions of the Examples and Comparative Examples were cured for 40 minutes in a convection oven maintained at 140° C.

Part B

The test samples prepared in Part A were subjected to microhardness ($F_h$) testing using a Fischerscope HCV, Model H-100 available from Fischer Technology, Inc. The microhardness, measured in Newtons (N) per $mm^2$, of the coated test samples was determined by taking 1 measurement at a depth of 2 microns in the center area of the test sample prepared for each Example under the conditions of a 100 milliNewton load, 30 load steps and 0.5 second pauses between load steps. The test results are listed in Table 2.

Part C

The test samples prepared in Part A were tested for photochromic response on an optical bench. Prior to testing on the optical bench, the test samples were exposed to 365 nanometer ultraviolet light for about 20 minutes to activate the photochromic compounds and then placed in a 75° C. oven for about 20 minutes to bleach (inactivate) the photochromic compounds. The coated test samples were then cooled to room temperature, exposed to fluorescent room lighting for at least 2 hours and then kept covered for at least 2 hours prior to testing on an optical bench. The bench was fitted with a 300 watt Xenon arc lamp, a remote controlled shutter, a Schott 3 mm KG-2 band-pass filter, which removes short wavelength radiation, neutral density filter(s), a quartz plated water cell sample holder for maintaining sample temperature in which the test sample to be tested was inserted.

The power output of the optical bench, i.e., the dosage of light that the sample test sample would be exposed to, was adjusted to 0.67 milliwatts per square centimeter (mW/cm$^2$) using a GRASEBY Optronics Model S-371 portable photometer (Serial #21536) with a UV-A detector (Serial #22411). The UV-A detector was placed into the sample holder and the light output was measured. Adjustments to the power output were made by increasing or decreasing the lamp wattage or by adding or removing neutral density filters in the light path.

A monitoring, collimated beam of light from a tungsten lamp was passed through the sample at 30° normal to the surface of the lens. After passing through the lens, the light from the tungsten lamp was directed through a 570 nanometer (nm) filter attached to a detector. The 570 nm filter passes wavelengths characteristic of the photochromic compound used in the examples. The output signals from the detector were processed by a radiometer. The control of the test conditions and acquisition of data was handled by the Labtech Notebook Pro software and the recommended I/O board.

Change in optical density ($\Delta$OD) from the bleached state to the darkened state was determined by establishing the initial transmittance, opening the shutter from the Xenon lamp to provide ultraviolet radiation to change the test sample from the bleached state to an activated (i.e., darkened) state at selected intervals of time, measuring the transmittance in the activated state, and calculating the change in optical density according to the formula: $\Delta$OD= log(% Tb/% Ta), where % Tb is the percent transmittance in the bleached state, % Ta is the percent transmittance in the activated state and the logarithm is to the base 10.

The $\Delta$OD was measured using a 570 nanometer filter after the first thirty (30) seconds of UV exposure and then after fifteen (15) minutes with the optical bench maintained at a temperature of 72° F (22° C.). The Bleach Rate (T 1/2) is the time interval in seconds for the $\Delta$OD of the activated form of the photochromic compound in the coated test samples to reach one half the highest $\Delta$OD at (72° F., 22° C.) after removal of the source of activating light. Results for the photochromic coated test samples for each Example are listed in Table 3.

TABLE 1

| Example Nos. | Spin Time Time (Seconds) |
|---|---|
| 2 | 3 |
| 1 and CE1 | 4 |
| CE2, CE3, 4, 5, 6, | 5 |

TABLE 1-continued

| Example Nos. | Spin Time Time (Seconds) |
|---|---|
| 7, 8, 9, 10 and 11 | |
| 3 | 6 |

TABLE 2

| Example No. | Fischer Microhardness Newtons/mm$^2$ |
|---|---|
| 1 | 117 |
| 2 | 98 |
| 3 | 77 |
| 4 | 97 |
| 5 | 77 |
| 6 | 55 |
| 7 | 80 |
| 8 | 84 |
| 9 | 64 |
| 10 | 110 |
| CE1 | 126 |
| CE2 | 42 |
| CE3 | 112 |

TABLE 3

| Example No. | $\Delta$OD @ 72° F. 30 seconds | $\Delta$OD @ 72° F. 15 minutes | T ½ seconds |
|---|---|---|---|
| 1 | 0.147 | 0.541 | 182 |
| 2 | 0.139 | 0.526 | 200 |
| 3 | 0.273 | 0.571 | 60 |
| 4 | 0.166 | 0.604 | 174 |
| 5 | 0.204 | 0.619 | 136 |
| 6 | 0.264 | 0.633 | 83 |
| 7 | 0.223 | 0.626 | 106 |
| 8 | 0.181 | 0.662 | 190 |
| 9 | 0.240 | 0.702 | 120 |
| 10 | 0.160 | 0.598 | 184 |
| 11 | 0.271 | 0.578 | 72 |
| CE1 | 0.097 | 0.505 | 449 |
| CE2 | 0.258 | 0.550 | 67 |
| CE3 | 0.132 | 0.568 | 245 |

The results of Tables 2 and 3 show that the lenses coated with the solutions of Examples 1 through 11 had microhardness results ranging from 55 to 117 Newtons/mm$^2$, rated a $\Delta$OD of at least 0.12 after 30 seconds and at least 0.50 after 15 minutes and had a fade rate of not more than 200 seconds, all tested at 72° F. (22° C.).

Coating prepared with the solutions of Comparative Examples 1 and 2 demonstrated Fischer microhardness levels within and below, respectively, of the desired range of 50 to 130 Newtons per mm$^2$ as compared to Examples 1, 2 and 3, which contain 40 to 50 weight percent NBMA and different levels of me or different monomers found in CE1 and CE2. Also, lenses having the CE1 coating had two out of three photochromic performance results outside of the desired range.

Comparative Example 3, which is a blend (80:20 based on weight) of the prepolymers used in Comparative Examples 1 and 2, respectively, demonstrated microhardness results within the desired range but the T1/2 result was outside of the desired range as compared to Examples 4, 5 and 6 which had weight ratios of prepolymers of CE1:CE2 of 60:40; 40:60; and 20:80, respectively.

The presence of different levels of catalyst in Examples 7, 8 and 9 demonstrated the effect of varying catalyst levels on the physical and photochromic properties of the cured coating. Also, the use of plasticizer in Examples 10 and 11, which contain the same formulation as CE1 except for the plasticizer, demonstrated one way to modify the properties of a coating to fall within the desired range.

Although the present invention has been described with reference to specific details of certain embodiments thereof, it is not intended that such details should be regarded as limitations upon the scope of the invention except insofar as they are included in the accompanying claims.

We claim:

1. An article comprising, in combination, a substrate and a photochromic alkoxyacrylamide coating on at least one surface of said substrate, said coating comprising N-alkoxymethyl(meth)acrylamide functional polymeric component(s), a photochromic amount of photochromic component(s) and a catalytic amount of catalyst.

2. The article of claim 1 wherein the coating exhibits a Fisher microhardness of at least 50 and not more than 130 Newtons per mm$^2$, a 72° F. $\Delta$OD of at least 0.12 after 30 seconds and at least 0.50 after 15 minutes, and a bleach rate of not more than 200 seconds.

3. The article of claim 1 wherein the N-alkoxymethyl (meth)acrylamide functional polymeric component is a free radical initiated reaction product of the following polymerizable ethylenically unsaturated monomers:

(a) from 25 to 80% by weight of an N-alkoxymethyl (meth)acrylamide; and (b) from 20 to 75% total by weight of at least one other ethylenically unsaturated monomer;

wherein the percentage by weight is based on total weight of the polymerizable ethylenically unsaturated monomers used in preparing the polymer.

4. The article of claim 3 wherein the ethylenically unsaturated monomer (b) is selected from esters of (meth)acrylic acids, poly(alkyleneglycol)(meth)acrylate monomers, (meth)acrylamidobutyraldehyde dialkyl acetal monomers, vinyl aliphatic monomers, vinyl aromatic monomers, epoxy-functional monomers or mixtures of such monomers.

5. The article of claim 4 wherein the ethylenically unsaturated monomer (b) is selected from styrene, methyl (meth) acrylate, cyclohexyl (meth)acrylate, butyl(meth)acrylate, isodecyl (meth)acrylate or mixtures thereof.

6. The article of claim 1 wherein the N-alkoxymethyl (meth)acrylamide is N-butoxymethylacrylamide.

7. The article of claim 3 wherein the N-alkoxymethyl (meth)acrylamide is present from 35 to 55 percent by weight.

8. The article of claim 1 wherein the catalyst is an acid-functional catalyst selected from phenyl acid phosphate, sulfonic acid, para-toluene sulfonic acid, dodecyl benzene sulfonic acid or a mixture of such acid functional catalysts.

9. The article of claim 1 wherein the coating further includes crosslinking agents, plasticizers or mixtures of crosslinking agents and plasticizers.

10. The article of claim 1 wherein the photochromic component comprises:

(a) at least one photochromic compound having a visible lambda max of from 400 nanometers to 525 nanometers; and (b) at least one photochromic compound having a visible lambda max of from greater than 525 nanometers to 700 nanometers.

11. The article of claim 10 wherein the photochromic compounds are benzopyrans, naphthopyrans, phenanthropyrans, quinopyrans, indeno-fused naphthopyrans, benzoxazines, naphthoxazines, spiro (indoline)pyridobenzoxazines, metal-dithizonates, fulgides, fulgimides or mixtures thereof.

12. The article of claim 1 wherein the photochromic alkoxyacrylamide coating has a thickness of from 5 to 200 microns.

13. The article of claim 12 wherein the thickness is from 10 to 40 microns.

14. The article of claim 1 wherein said substrate is paper, glass, ceramic, wood, masonry, textile, metal or polymeric organic material.

15. The article of claim 14 wherein the polymeric organic material is a solid transparent polymer selected from the group consisting of poly(methyl methacrylate), poly (ethylene glycol bismethacrylate), poly(ethoxylated bisphenol A dimethacrylate), thermoplastic polycarbonate, poly (vinyl acetate), polyvinylbutyral, polyurethane, polythiourethanes, and polymers of members of the group consisting of diethylene glycol bis(allyl carbonate) monomers, diethylene glycol dimethacrylate monomers, ethoxylated phenol methacrylate monomers, diisopropenyl benzene monomers, ethoxylated trimethylol propane triacrylate monomers and mixtures thereof.

16. The article of claim 15 wherein said substrate is an optical element.

17. The article of claim 16 wherein said optical element is a lens.

18. The article of claim 17 wherein the refractive index of said lens is from 1.48 to 1.75.

19. A photochromic article comprising the polymerizate of a polymerizable composition comprising N-alkoxymethyl (meth)acrylamide functional polymeric component(s), a photochromic amount of photochromic component(s) and a catalytic amount of catalyst.

20. The photochromic article of claim 19 wherein the polymerizate exhibits a Fischer microhardness of at least 50 and no more than 130 Newtons per mm$^2$, a 72° F. $\Delta$OD of at least 0.12 after 30 seconds and at least 0.50 after 15 minutes, and a bleach rate of no more than 200 seconds.

21. The photochromic article of claim 19 wherein said article is a lens.

22. The photochromic article of claim 21 wherein said article has a thickness of at least 0.5 millimeters.

* * * * *